(12) United States Patent
Kanarek

(10) Patent No.: US 12,261,475 B1
(45) Date of Patent: Mar. 25, 2025

(54) DEVICE, SYSTEM, AND METHOD FOR PARALLEL CHARGING STACKED CINEMATOGRAPHY BATTERY PACKS

(71) Applicant: Core SWX, LLC, Plainview, NY (US)

(72) Inventor: Ross Kanarek, Plainview, NY (US)

(73) Assignee: Core SWX, LLC, Plainview, NY (US)

( * ) Notice: Subject to any disclaimer, the term of this patent is extended or adjusted under 35 U.S.C. 154(b) by 0 days.

(21) Appl. No.: 18/678,029

(22) Filed: May 30, 2024

Related U.S. Application Data

(63) Continuation-in-part of application No. 18/632,097, filed on Apr. 10, 2024, now Pat. No. 12,095,291.

(60) Provisional application No. 63/573,527, filed on Apr. 3, 2024.

(51) Int. Cl.
| | |
|---|---|
| *H02J 7/00* | (2006.01) |
| *H01M 50/247* | (2021.01) |
| *H01M 50/262* | (2021.01) |
| *H01R 13/62* | (2006.01) |
| *H02J 7/34* | (2006.01) |
| *H04N 5/222* | (2006.01) |

(52) U.S. Cl.
CPC .......... *H02J 7/342* (2020.01); *H01M 50/247* (2021.01); *H01M 50/262* (2021.01); *H01R 13/6205* (2013.01); *H02J 7/00032* (2020.01); *H02J 7/0013* (2013.01); *H02J 7/0045* (2013.01); *H01M 2220/30* (2013.01); *H04N 5/222* (2013.01)

(58) Field of Classification Search
CPC ........................... H02J 7/0013; H02J 7/00032
See application file for complete search history.

(56) References Cited

U.S. PATENT DOCUMENTS

| | | | | |
|---|---|---|---|---|
| 2006/0125444 A1* | 6/2006 | Lam | ..................... | H01M 50/244 320/107 |
| 2016/0301044 A1* | 10/2016 | Huang | ................ | H01M 50/296 |

* cited by examiner

*Primary Examiner* — Robert Grant
(74) *Attorney, Agent, or Firm* — Shore IP Group, PLLC; Sean R. Wilsusen

(57) ABSTRACT

A system for engaging cinematography battery packs with a cinematography device includes two cinematography battery packs, and a fastening plate. A first cinematography device includes a first magnetic member for magnetically connecting with a third magnetic member of a second cinematography device, and a second magnetic member for magnetically connecting with a fourth magnetic member of the fastening plate. The first cinematography device also includes a first electrical connection configured to electrically connect with a fourth electrical connection of the fastening plate, and a second electrical connection configured to electrically connect with a third electrical connection of the second cinematography battery pack.

20 Claims, 17 Drawing Sheets

DEVICE, SYSTEM, AND METHOD FOR PARALLEL CHARGING STACKED CINEMATOGRAPHY BATTERY PACKS

CROSS-REFERENCE TO RELATED APPLICATION

The present U.S. Non-Provisional patent application is a Continuation-In-Part of U.S. patent application Ser. No. 18/632,097, filed on Apr. 10, 2024, which claims priority to U.S. Provisional Patent Application No. 63/573,527, filed on Apr. 3, 2024, the entire contents of each of which are incorporated by reference herein.

FIELD

The present disclosure relates to a cinematography battery pack and, more particularly, to a device, system, and method for parallel charging and discharging multiple stacked cinematography battery packs.

BACKGROUND

In the dynamic landscape of the cinema accessory market, where production demands are constantly evolving alongside advancements in camera technology, the necessity for an accessory-based power management system has become increasingly evident. Unlike traditional power solutions tethered to specific devices, an independent accessory power management system offers versatility and flexibility to cater to the diverse power requirements of production accessories.

Such a system can address the potential limitations posed by device-centric power sources, such as V/G/B mount battery packs which attach to devices. These sources may prioritize powering the primary device, leaving limited capacity or incompatible voltage outputs for supporting ancillary accessories. By decoupling the power source from the device, an accessory-based power management system can provide dedicated power outputs tailored to the unique voltage and current requirements of various production accessories.

Furthermore, to meet the strenuous power-handling requirements of large camera rig systems with many accessories, multiple battery packs can be connected in parallel to increase the overall capacity and discharge capability of the system. However, conventional methods of parallel connection may involve the use of additional mounting hardware for battery packs or wired connections, which can be cumbersome, prone to wear and tear, and may require extensive maintenance.

SUMMARY

The present disclosure provides a device, method and system for parallel connection of battery packs and a fastening plate utilizing a magnetic and electrical coupling mechanism. Embodiments of the present disclosure facilitate the stacking of cinematography battery packs in a parallel configuration, allowing efficient electrical, mechanical, and data transfer connection between adjacent packs and a fastening plate without the need for traditional wired connections. This innovative approach may employ electrical connection pads and leaf spring-type connectors, enabling secure and reliable electrical contact while minimizing the complexity and weight associated with conventional wiring methods, while also avoiding the use of pins which can misalign and break.

By paralleling multiple packs, users can extend runtime and power capacity to meet the demands of prolonged shoots or power-hungry accessories. Additionally, the ability to hot-swap depleted cinematography battery packs with fully charged cinematography battery packs allows for uninterrupted workflow continuity, eliminating downtime associated with battery recharging.

Incorporating USB-C PD (power delivery) charging capability into the accessory power management device, system, and method described herein adds another dimension of convenience and versatility. By leveraging the standardized USB-C PD protocol, users can efficiently charge battery packs using readily available USB-C PD chargers, streamlining the charging process and reducing dependency on proprietary charging solutions. The stackable design further enhances this functionality, allowing users to charge multiple cinematography battery packs simultaneously, optimizing workflow efficiency during downtime or off-site shoots.

The devices, system, and method described herein represents a transformative solution tailored to the unique needs of the cinema accessory market. By providing dedicated, reliable power outputs, robust mechanical connectivity, and seamless integration with USB-C PD charging, the device, system, and method described herein empowers filmmakers and production professionals to elevate their creative capabilities while allowing for operational reliability and efficiency in every shoot.

Provided in accordance with aspects of the present disclosure is a system for engaging cinematography battery packs with a cinematography device. The system includes a first cinematography battery pack, a second cinematography battery pack, and a fastening plate. The first cinematography battery pack includes a first magnetic member coupled to a first surface of the first cinematography battery pack, a second magnetic member coupled to a second surface of the first cinematography battery pack, a first electrical connection supported by the first surface of the first cinematography battery pack, and a second electrical connection supported by the second surface of the first cinematography battery pack. The second cinematography battery pack is configured to be electrically and mechanically connected with the first cinematography battery pack, and includes a third magnetic member coupled to a first surface of the second cinematography battery pack, and a third electrical connection supported by the first surface of the second cinematography battery pack. The third magnetic member is configured to magnetically engage the second magnetic member to magnetically connect the first cinematography battery pack with the second cinematography battery pack. The third electrical connection is configured to engage the second electrical connection to electrically connect the first cinematography battery pack with the second cinematography battery pack. The fastening plate is configured to be mechanically and electrically connected with the first cinematography battery pack, and is configured to be mechanically connected with a cinematography device. The fastening plate includes a fourth magnetic member coupled to a first surface of the fastening plate, and a fourth electrical connection supported by the first surface of the fastening plate. The fourth magnetic member is configured to magnetically engage the first magnetic member to magnetically connect the fastening plate with the first cinematography battery pack. The fourth electrical connection is configured to engage the first electrical connection to electrically connect the fastening plate with the first cinematography battery pack.

In an aspect of the present disclosure, the fastening plate is configured to be electrically connected with the cinematography device.

In an aspect of the present disclosure, the fastening plate includes a fifth electrical connection supported by the second surface of the fastening plate. The fifth electrical connection is configured to engage an electrical connection of the cinematography device to electrically connect the fastening plate with the cinematography device.

In an aspect of the present disclosure, the fastening plate includes a V-mount battery mount arrangement.

In an aspect of the present disclosure, the fastening plate includes a G-mount battery mount arrangement.

In an aspect of the present disclosure, the fastening plate includes a B-mount battery mount arrangement.

In an aspect of the present disclosure, the system includes at least one power port defined in the first cinematography battery pack or the second cinematography battery pack. The at least one power port is configured to charge the first cinematography battery pack and the second cinematography battery pack in a parallel arrangement by a single source of electrical power connected with one of the first cinematography battery pack or the second cinematography battery pack.

In an aspect of the present disclosure, the at least one power port is configured to discharge the first cinematography battery pack and the second cinematography battery pack in the parallel arrangement.

In an aspect of the present disclosure, the at least one power port is configured to power an accessory product.

In an aspect of the present disclosure, the at least one power port includes at least one of a USB-C PD power port or a DTAP port.

In an aspect of the present disclosure, the second electrical connection of the first cinematography battery pack and the third electrical connection of the second cinematography battery pack define an electrical power connection assembly. The electrical connection assembly is configured to transmit electrical power and data.

In an aspect of the present disclosure, the first electrical connection of the first cinematography battery pack and the fourth electrical connection of the fastening plate define an electrical power connection assembly. The electrical connection assembly is configured to transmit electrical power and data.

In an aspect of the present disclosure, the second electrical connection of the first cinematography battery pack and the third electrical connection of the second cinematography battery pack define a leaf spring electrical connection assembly.

In an aspect of the present disclosure, the first electrical connection of the first cinematography battery pack and the fourth electrical connection of the fastening plate define a leaf spring electrical connection assembly.

In an aspect of the present disclosure, the fastening plate includes at least one of a printed circuit board or an electrical interconnect associated with the fourth electrical connection.

Provided in accordance with aspects of the present disclosure is a fastening plate configured to be mechanically and electrically connected with a cinematography battery pack and a cinematography device. The fastening plate includes a magnetic member, a first electrical connection, and a second electrical connection. The magnetic member is coupled to a first surface of the fastening plate and is configured to magnetically engage a magnetic member of the first cinematography battery pack. The first electrical connection is supported by the first surface of the fastening plate and is configured to electrically engage an electrical connection on the cinematography battery pack. The second electrical connection is supported by a second surface of the fastening plate and is configured to electrically engage an electrical connection on the cinematography device.

In an aspect of the present disclosure, the second surface of the fastening plate is configured to mechanically engage the cinematography device utilizing one of a V-mount battery mount arrangement, a G-mount battery mount arrangement, or a B-mount battery mount arrangement.

In an aspect of the present disclosure, the second electrical connection includes at least one of a printed circuit board or an electrical interconnect.

In an aspect of the present disclosure, the first electrical connection of the fastening plate and the electrical connection of the cinematography battery pack define a first electrical power connection assembly. The first electrical connection assembly is configured to transmit electrical power and data.

In an aspect of the present disclosure, the second electrical connection of the fastening plate and the electrical connection of the cinematography device define a second electrical power connection assembly. The second electrical connection assembly is configured to transmit electrical power and data.

BRIEF DESCRIPTION OF THE DRAWINGS

Various aspects and features of the present disclosure are described hereinbelow with reference to the drawings wherein.

DETAILED DESCRIPTION

Figure 1:
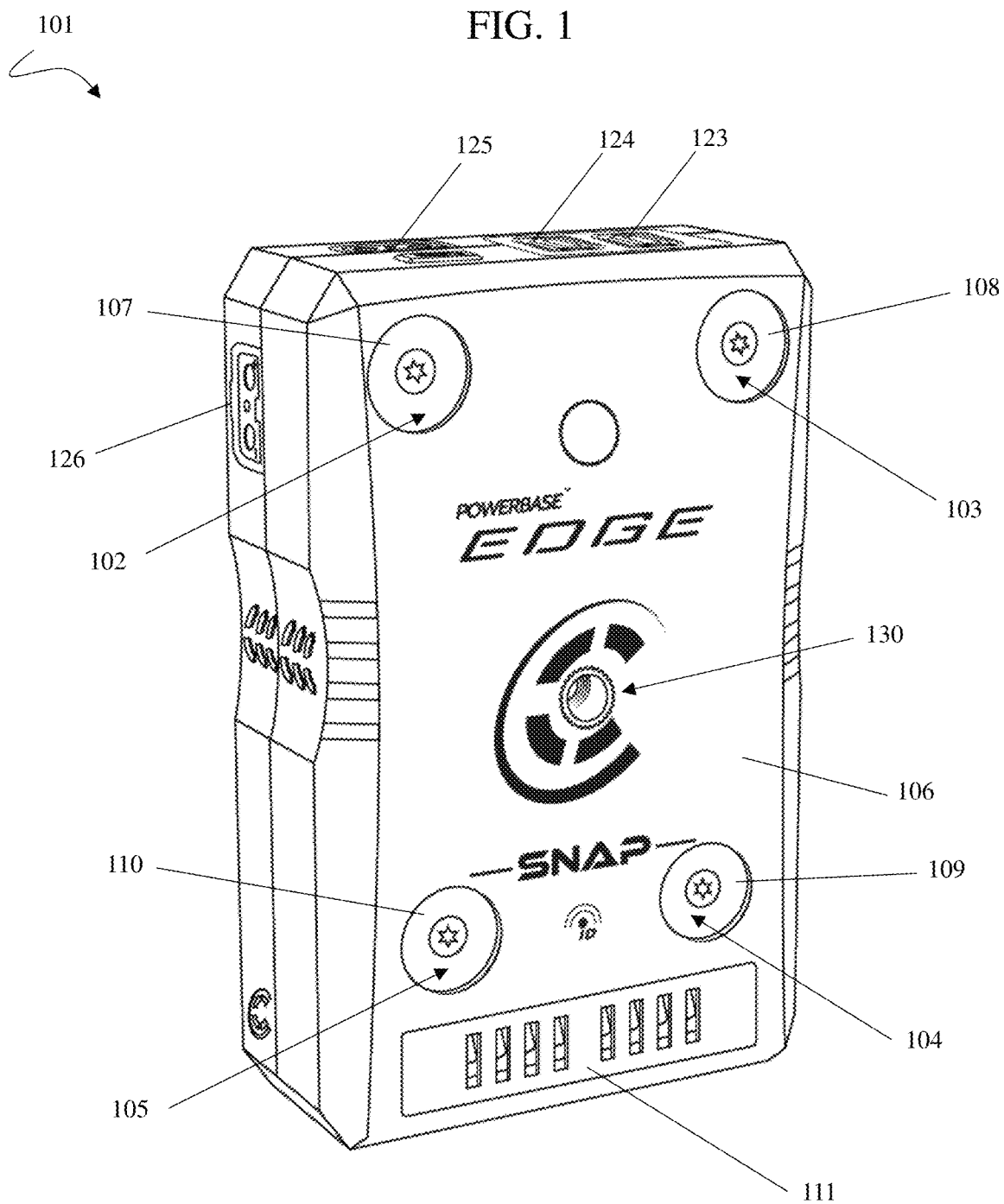
FIG. 1 is a front, perspective view of a cinematography battery pack configured for parallel charging and discharging with another cinematography battery pack according to aspects of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

The phrases "battery mount," "mount plate," and "battery mount plate" may be used interchangeably herein. The phrases "battery," "battery pack," "cinematography battery," "cinematography battery pack," and "pack" may be used interchangeably herein.

The present disclosure provides a device, system, and method for parallel connection of cinematography battery packs utilizing a magnetic coupling mechanism. The present disclosure facilitates the stacking of cinematography battery packs in a parallel configuration, allowing efficient electrical, mechanical, and/or data communication connection between adjacent cinematography battery packs without the need for wired connections.

In an aspect of the present disclosure, the device, system, and method employ electrical connection pads and leaf spring-type connectors, enabling secure and reliable electrical contact while minimizing the complexity and weight associated with conventional wiring methods, while also avoiding the use of pins which can misalign and break.

The incorporation of magnetic pads within the accessory-based power management device, system, and method according to the present disclosure incorporates an efficient method for aligning and securing cinematography battery packs during stacking while facilitating electrical, mechanical, and data transfer connections between the cinematography battery packs.

The magnetic/metal connection assembly described herein can be employed to align and secure cinematography battery packs to each other in a stacked arrangement. Each cinematography battery pack within the system may be equipped with magnetic pads strategically positioned along its edges or corners. These magnetic pads are designed to attract and align with corresponding magnetic pads on adjacent cinematography battery packs. The magnetic attraction enables precise alignment and secure stacking of the cinematography battery packs, eliminating the need for manual alignment or additional securing mechanisms.

The metal/magnetic pads of the magnetic connection assembly described herein may employ the two sets of pads on each pack that are not symmetrical, allowing for the packs to connect in only one direction.

In an aspect of the present disclosure, a mechanical push-button release assembly incorporated into each cinematography battery pack can be employed to disconnect connected cinematography battery packs from each other.

The device, system, and method described herein may employ an electrical pad/leaf spring connection. For example, in addition to the magnetic pads of the magnetic coupling assembly described herein, each cinematography battery pack may employ electrical pads and/or leaf spring connectors. These connectors may be integrated into the cinematography battery pack's structure and serve as the primary means of electrical connection between adjacent cinematography battery packs. For example, when two cinematography battery packs are stacked and aligned using the magnetic pads of the magnetic coupling assembly, the electrical pads or leaf spring connectors make contact with corresponding pads on the adjacent cinematography battery pack, establishing a secure electrical and/or data communication connection between two connected cinematography battery packs.

The device, system, and method described herein may employ a secondary fastening plate. While the cinematography battery packs themselves may include fastener attachments for securing the packs to mounting points or rigging systems, a secondary part may be utilized to increase the system's versatility. The secondary fastening plate may employ additional magnetic pads and attachment points. These additional attachment points provide users with greater flexibility in securing and mounting the cinematography battery packs with another structure or device (e.g., another cinematography battery pack, a cinematography apparatus such as a camera, lighting system, or another device powered by a cinematography battery pack. As an example, the secondary fastening plate may be employed in scenarios where multiple attachment points are required for stability or customization.

The magnetic connection assembly may employ opposing magnetic connection pads. The opposing magnetic connection pads may incorporate permanent magnets capable of generating sufficient attractive forces to provide secure alignment and contact between cinematography battery packs (e.g., magnetic forces requiring from about 1 pound to about 10 pounds of force to break).

The magnetic pads may employ polarization to facilitate proper orientation during stacking, thereby preventing misalignment.

The electrical connection assembly may employ reciprocally arranged leaf spring-type connectors or similar electrical contact elements arranged at one end of each cinematography battery pack. The electrical connectors of the electrical connection assembly are arranged to engage with the mating pads on adjacent cinematography battery packs upon magnetic coupling, establishing electrical and/or data communication continuity between the cinematography packs.

In use, to parallelize the cinematography battery packs, the cinematography battery packs are stacked upon each other in a desired configuration. As the cinematography battery packs are stacked, the magnetic connection pads on each cinematography battery pack attract and align with the corresponding pads on neighboring cinematography battery packs. Simultaneously or substantially simultaneously, the leaf spring-type connectors make electrical and/or data communication contact with the mating pads, completing the parallel connection.

Once stacked and connected, the cinematography battery packs form a parallel electrical pathway, allowing the combined energy storage capacity and output capability of the system to be utilized efficiently. That is, the stacked cinematography battery packs are configured to be charged and to discharge as a single electrical bank. The magnetic coupling assembly described herein facilitates low-resistance electrical connections, minimizing power losses and optimizing system performance.

Unless otherwise indicated herein, each of the battery packs described have the same configuration as each other, and any number of such battery packs can be stacked and both mechanically and electrically connected with each other, as described herein. Thus, duplicative descriptions may be omitted.

Referring to FIGS. 1 to 12, a system (e.g., system 100) for parallel charging and discharging of multiple cinematography battery packs includes a first cinematography battery pack 101. The first cinematography battery pack 101 includes at least two orifices (see, e.g. orifices 102, 103, 104 and 105 in FIG. 1) defined in a first surface 106 of the first cinematography battery pack 101. A first metal or magnetic member (see, e.g., metal or magnetic members 107, 108, 109, and 110 in FIG. 1) is arranged in each of the orifices. A female electrical connection 111 is supported by the first surface 1006 of the first cinematography battery pack 101. A second cinematography battery pack 112 is configured to be electrically and mechanically connected with the first cinematography battery pack 101. The second cinematography battery pack 112 includes at least two projections (see, e.g., projections 113, 114, 115, and 116 in FIG. 2) extending from a second surface 117 of the second cinematography battery pack 112. A second metal or magnetic member (see, e.g., metal or magnetic members 118, 119, 120, and 121 in FIG. 2) is supported by each of the projections. Each second metal or magnetic member is configured to connect with the corresponding first metal or magnetic member to magnetically connect the first cinematography battery pack 101 with the second cinematography battery pack 112. A male electrical connection 122 is supported by the second surface 117 of the second cinematography battery pack 112. The male electrical connection 122 is configured to be received in the female electrical connection 111 to electrically connect the first cinematography battery pack 101 with the second cinematography battery pack 112. At least one power port (see, e.g., power ports 123, 124, 125, and 126) is defined in the first cinematography battery pack 101 or the second cinematography battery pack 112. The power port is configured to charge the first cinematography battery pack 101 and the second cinematography battery pack 112 in a parallel arrangement by a single source of electrical power. The power port is also configured to discharge the first cinematography battery pack 101 and the second cinematography battery pack 112 in the parallel arrangement.

A shape, size, and dimensions of each of the orifices, protrusions and magnets are arranged to correspond with each other. That is, the orifices are shaped to receive the protrusions therein (e.g., to prevent lateral movement of the cinematography battery packs with respect to each other). As an example, each of the protrusions and orifices may define a circular, cylindrical, or tubular shape.

A shape defined by the magnetic or metal members may be circular, cylindrical, or donut shaped. A size defined by each of the metal or magnetic members may be arranged so that the metal or magnetic member fit into the orifices or at a distal-facing end of the projections. The projections may also be referred to as posts or protrusions, and the orifices may also be referred to as indents or recesses. In use, the metal or magnetic members may be arranged to directly contact each other. The metal or magnetic members may each be secured to the corresponding projection or orifices by a connecting member, such as a screw, grommet, or the like.

Figure 2:
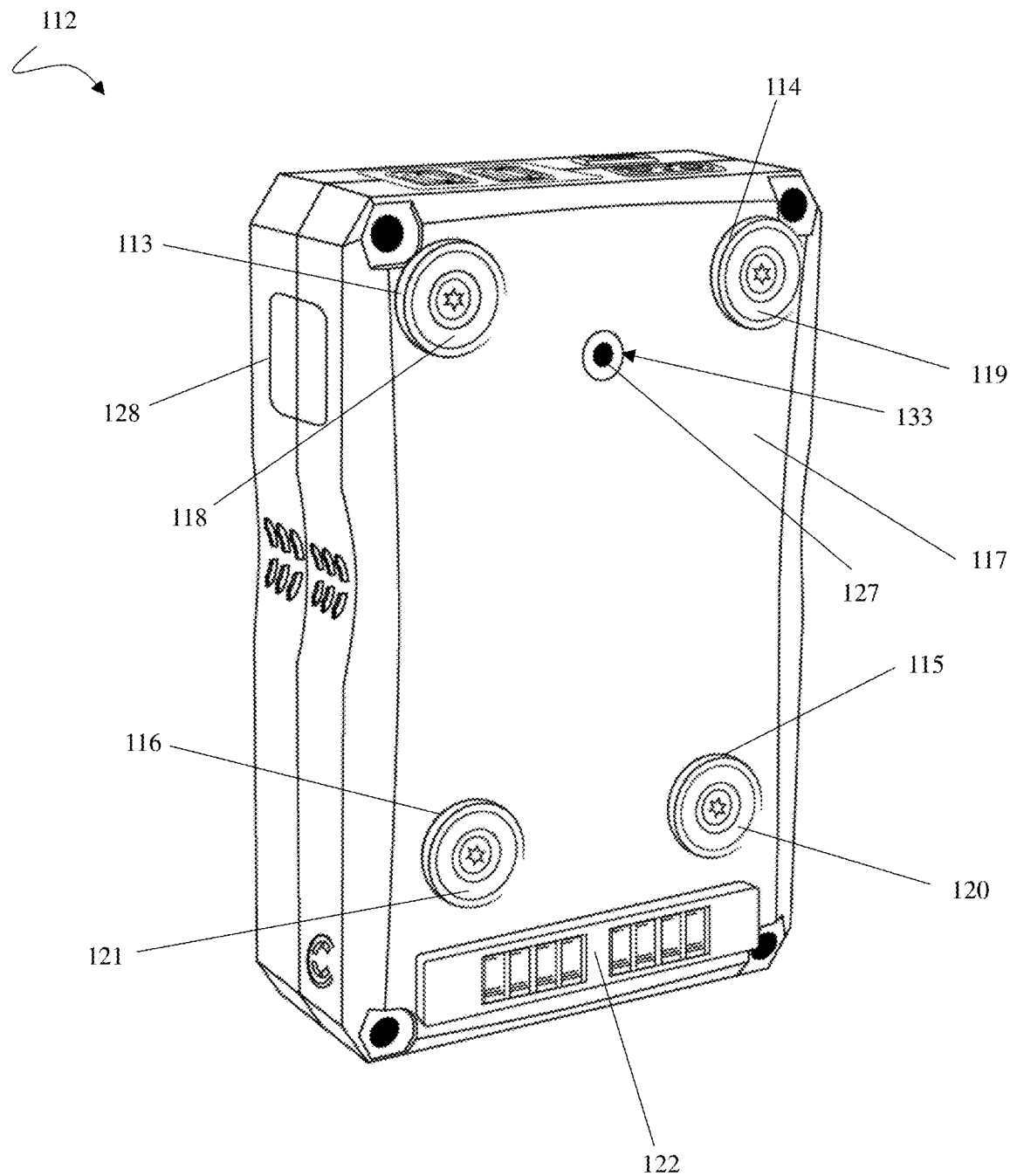
FIG. 2 is a rear, perspective view of the cinematography battery pack of FIG. 1.
Figure 3:
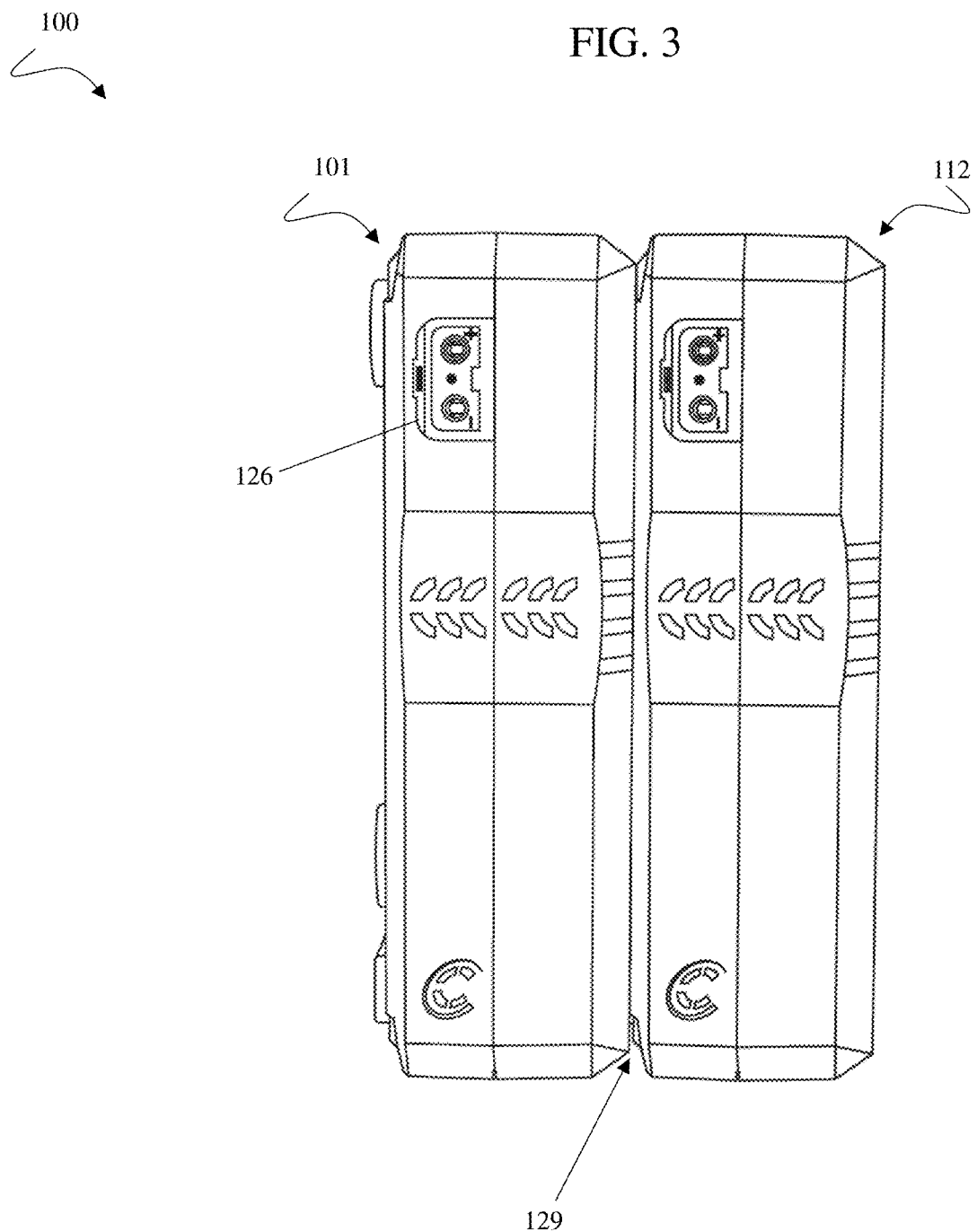
FIG. 3 is a side view of two stacked cinematography battery packs of a system for parallel charging and discharging of multiple cinematography battery packs according to aspects of the present disclosure.
Figure 4:
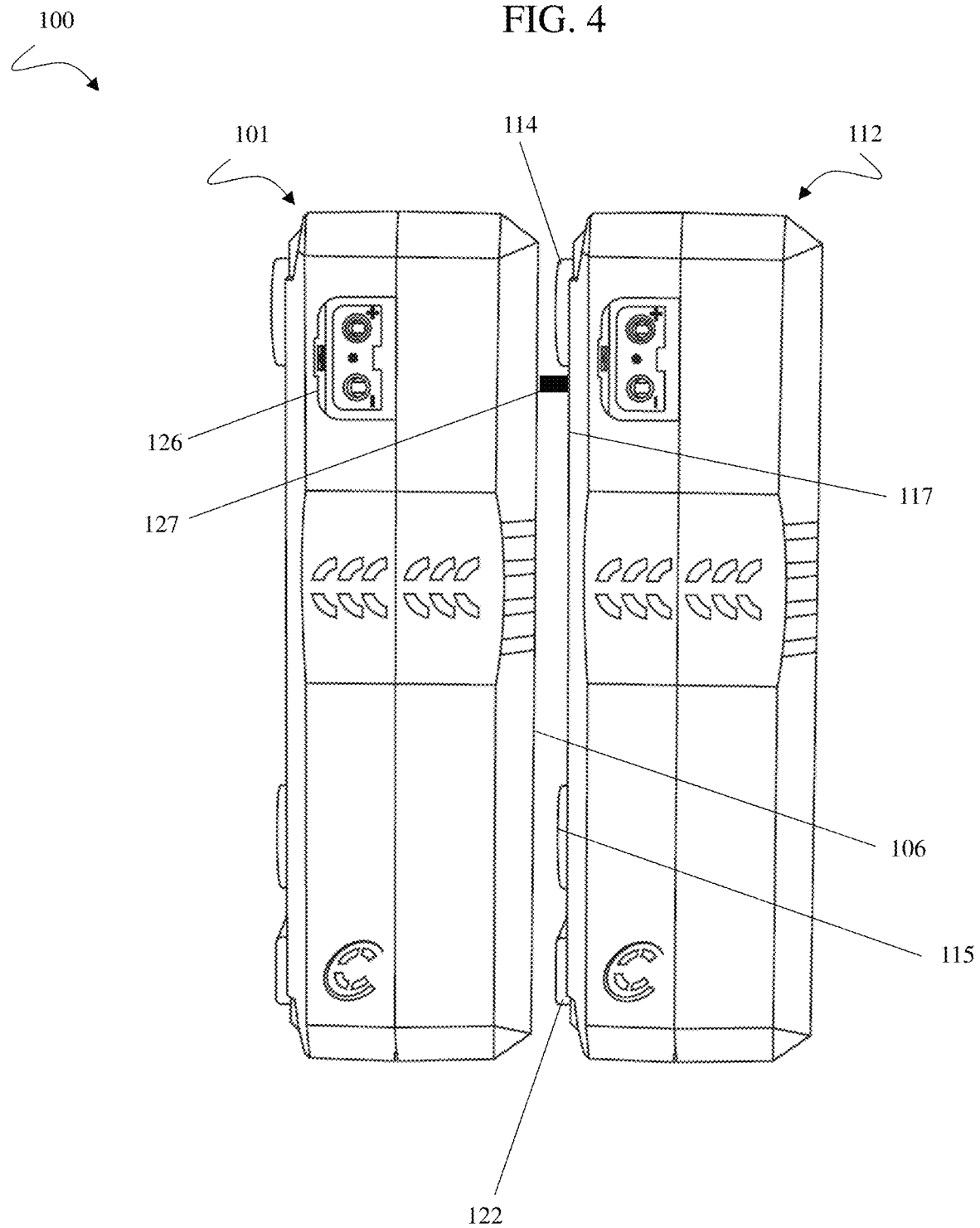
FIG. 4 is a side view of the two stacked cinematography battery packs of FIG. 3 in a separated arrangement.
Figure 5:
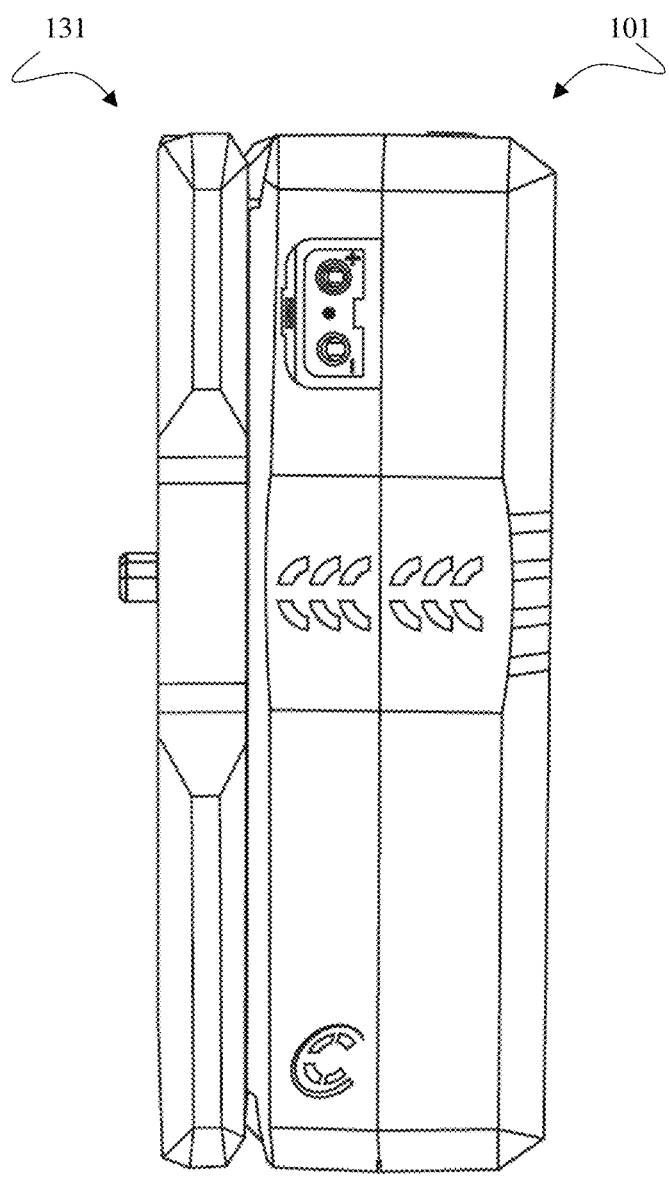
FIG. 5 is a side view of the cinematography battery pack of FIG. 1 coupled with a fastening plate according to aspects of the present disclosure.
Figure 6:
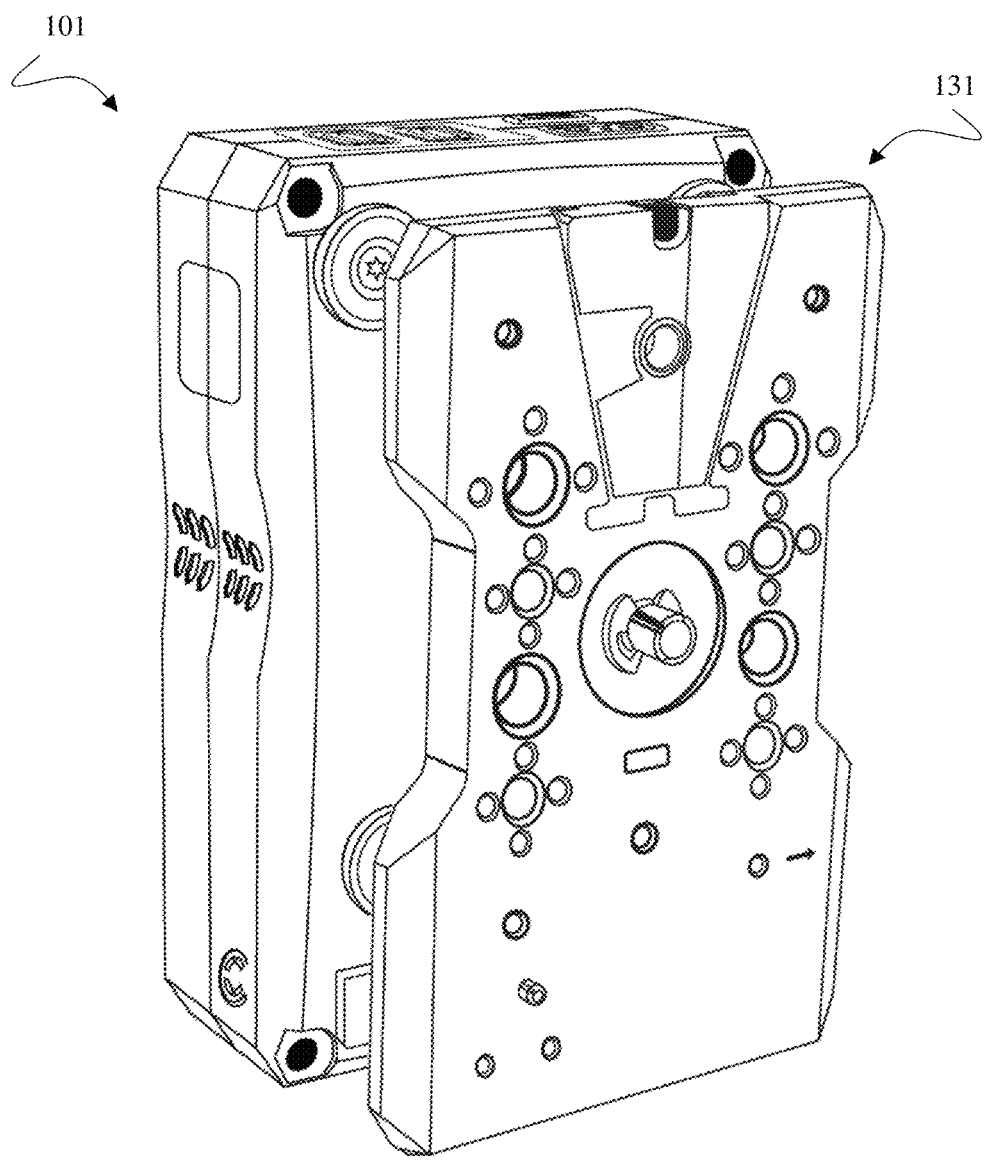
FIG. 6 is a rear, perspective view of the cinematography battery pack and the fastening plate of FIG. 5 in a separated arrangement.
Figure 7:
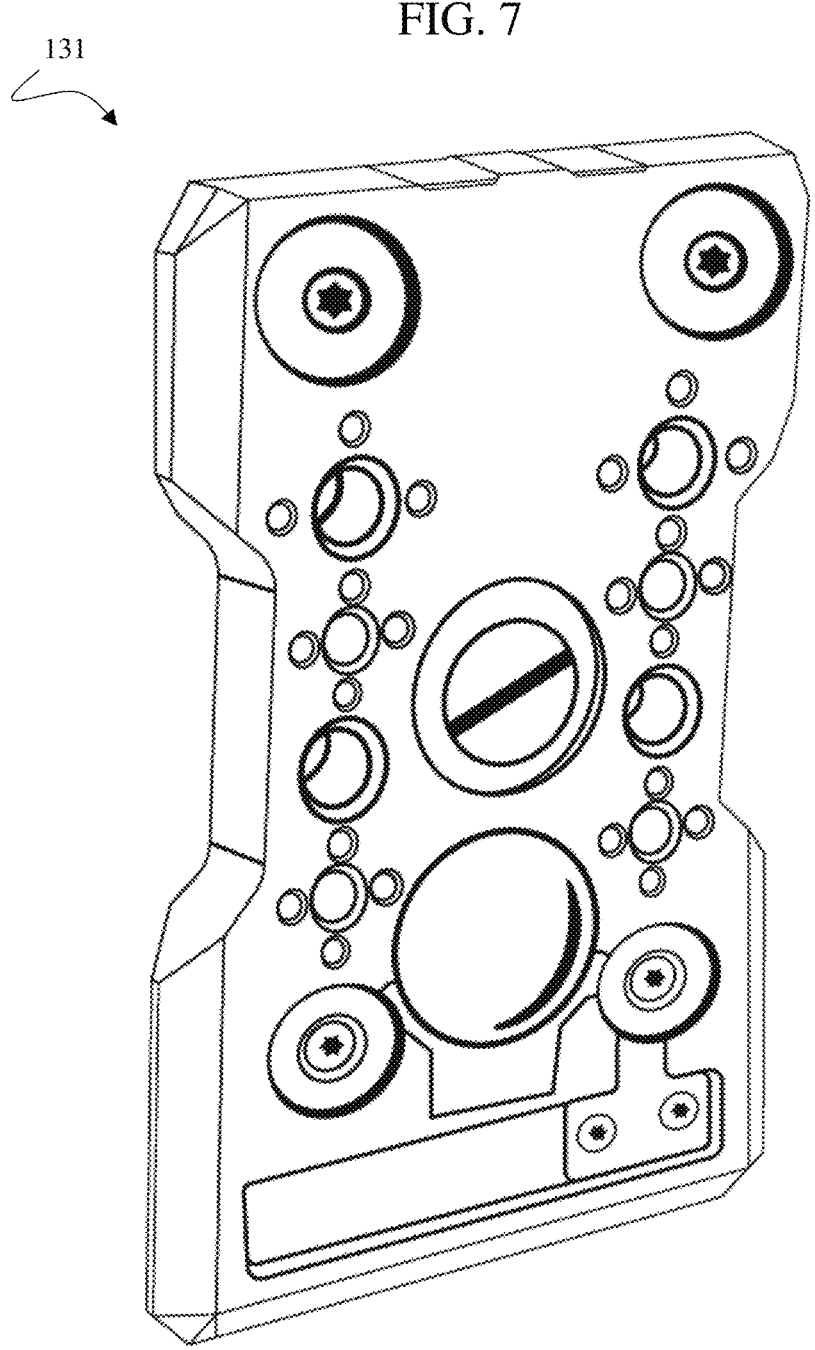
FIG. 7 is a rear, perspective view of the fastening plate of FIG. 5.

Referring particularly to FIGS. 2 to 4, an actuatable post 127 is arranged in the second cinematography battery pack 112. The actuatable post 127 is configured to be actuated between a first retracted position (see, e.g., FIG. 4) and a second extended position (see, e.g., FIG. 4). An actuation button 128 is arranged in the second cinematography battery pack 112. The actuation button 128 is operably coupled with the actuatable post 127. The actuation button 128 is configured to actuate the actuatable post 127 between the first retracted position and a second extended position. Upon actuation of the actuatable post 127 to the extended position, the actuatable post 127 pushes against the first surface 106 of the first cinematography battery pack 101 to separate the first cinematography battery pack 101 from the second cinematography battery pack 112.

In use, depressing the actuation button 128 causes actuation of the actuatable post 127 which applies pressure to adjacent cinematography battery pack to separate the first cinematography battery pack 101 from the second cinematography battery pack 112. The actuatable post 127 makes separating cinematography battery packs easier by at least partially mechanically separating cinematography battery packs from each other without the need for a user to manually apply enough force to break the magnetic connection between the cinematography battery packs. The actuatable post 127 may partially separate the cinematography battery packs from each, such as by breaking the magnetic connection between two orifices/posts but maintaining the magnetic connection between two other orifices/posts, such that final separation of the cinematography battery packs is achieved though the application of manual force by a user. Thus, separating the cinematography battery packs can occur in two steps, first by the actuation of the actuatable post 127 to partially separate the cinematography battery packs, and second by a user manually applying a mechanical force (e.g., by pulling the cinematography battery packs apart) to complete the separation of the cinematography battery packs.

The actuatable post 127 may be offset from a center of the corresponding cinematography battery pack. The actuatable post 127 may be arranged in a recess or orifice 133. A distal-most end of the actuatable post may be flush with an outer surface of the corresponding cinematography battery pack. The actuatable post 127 may define a cylindrical shape, for example.

Referring particularly to FIGS. 1 and 8 to 10, each cinematography battery pack may include a number of charging ports (see, e.g., power ports 123, 124, 125, and 126) arranged about the cinematography battery pack. Each charging port configured to power an accessory product such as a camera (i.e., to discharge the cinematography battery pack or stacked cinematography battery packs in a parallel arrangement). Each charging port is also configured to charge the cinematography battery packs or stacked cinematography battery packs in a parallel arrangement.

As an example, the charging ports (see, e.g., power ports 123, 124, 125, and 126) may include a USB-C PD power port or a DTAP port, or a number of each type of ports. Other USB ports may also be included in the cinematography battery packs (e.g., USB-A, etc.).

In an aspect of the present disclosure, the female electrical connection 111 and the male electrical connection 122 define an electrical power connection assembly 129 (see, e.g., FIG. 3). The electrical connection assembly 129 is configured to transmit electrical power and data.

For example, the female electrical connection 111 and the male electrical connection 122 define a leaf spring electrical connection assembly.

Referring particularly to FIGS. 5 to 7, 11 and 12, a fastening orifice 130 is defined in the first surface 106 of the first cinematography battery pack 101. The fastening orifice 130 is configured to couple the first cinematography battery pack 101 with another structure.

As an example, the fastening orifice 130 may be a threaded bore configured to receive a connecting member, such as a screw or bolt therein.

In an aspect of the present disclosure, a fastening plate 131 is configured to connect with the first cinematography battery pack 101 or the second cinematography battery pack 112.

Figure 11:
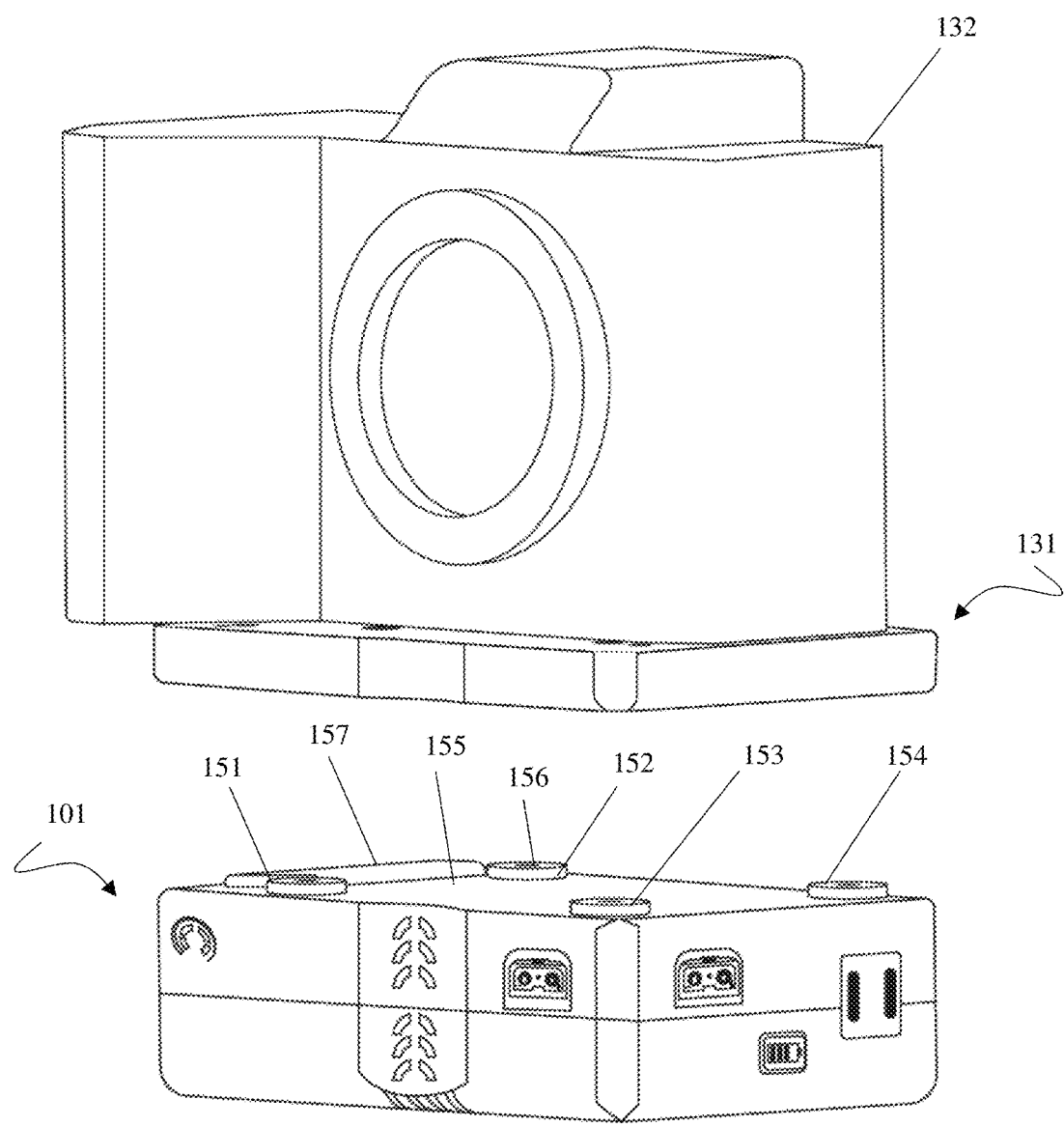
FIG. 11 is a perspective view of a fastening plate coupled to a cinematography camera configured to mate with an aligned cinematography battery pack according to aspects of the present disclosure.
Figure 12:
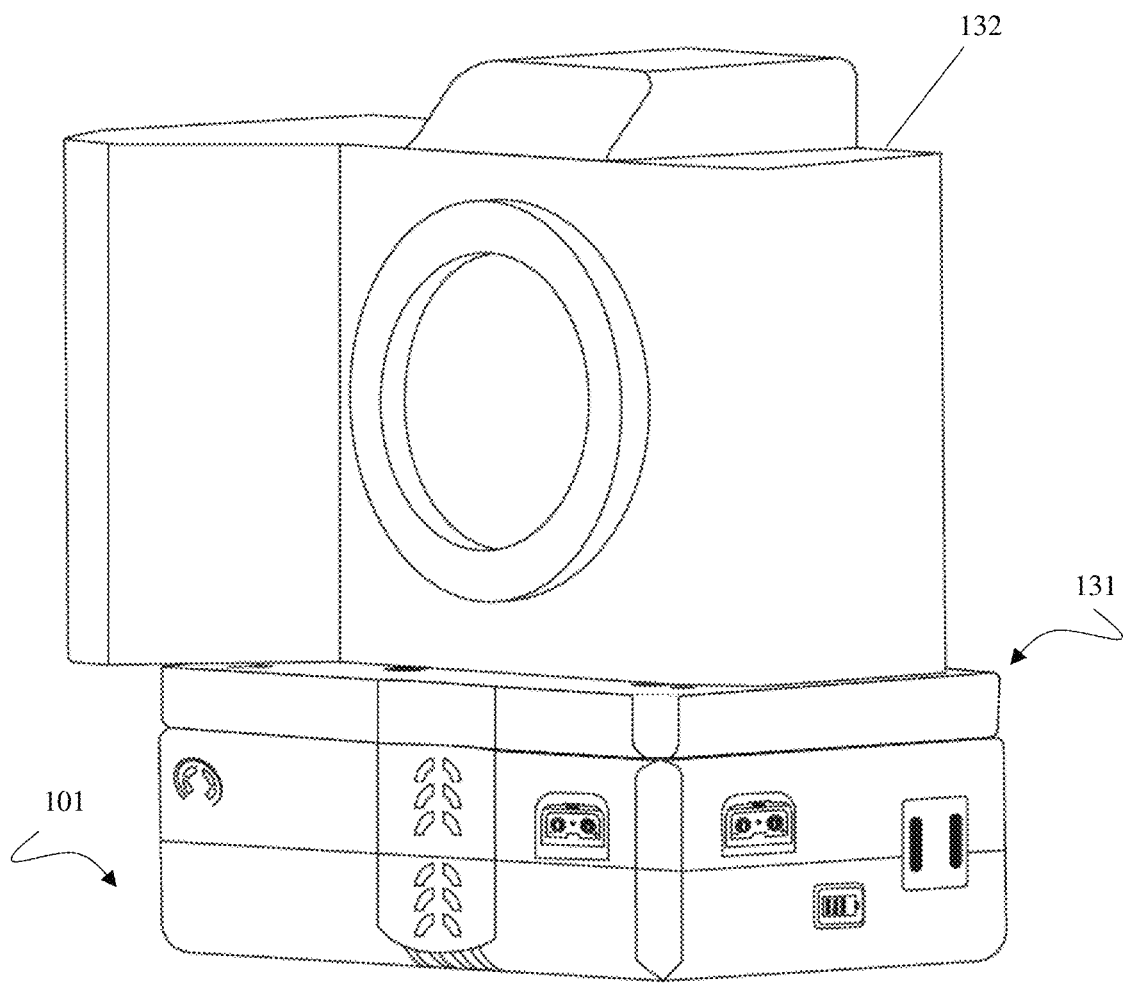
FIG. 12 is a perspective view of the fastening plate and cinematography battery pack of FIG. 11 with the cinematography battery pack magnetically coupled with the fastening plate.

In use, the fastening plate 131 is configured to mechanically and/or electrically connect with a cinematography device (see, e.g., camera 132 in FIGS. 11 and 12). The fastening plate 131 is configured to form a mechanical and/or electrical connection between the first cinematography battery pack 101 or the second cinematography battery pack 112 and the cinematography device. The fastening plate 131 may include orifices or projections corresponding with the orifices or projections of the cinematography battery packs.

In an aspect of the present disclosure, the at least two orifices include at least four orifices and the at least two projections include at least four projections. The orifices of the at least four orifices and the projections of the at least four projections are asymmetrically aligned with each other to form a directional orientation between the first cinematography battery pack 101 and the second cinematography battery pack 112. As an example, two of the orifices and projections may be relatively closer to a midline or center of the corresponding cinematography battery packs.

In an aspect of the present disclosure, the metal or magnetic members of each of the at least four orifices and the at least four projections each define a polarity. The polarity of the metal or magnetic members of each of the at least four orifices and the at least four projections is arranged to prevent misalignment between the first cinematography battery pack 101 and the second cinematography battery pack 112.

Referring generally to FIGS. 1 to 12, a cinematography battery pack 101 for parallel charging and discharging with other cinematography battery packs includes at least two orifices defined in a first surface of the cinematography battery pack. A first metal or magnetic member is arranged in each of the at least two orifices. A female electrical connection is supported by the first surface of the cinematography battery pack. at least two projections extend from a second surface of the cinematography battery pack. A second metal or magnetic member is supported by each of the at least two projections. Each second metal or magnetic member is configured to connect with the corresponding first metal or magnetic member to magnetically connect the cinematography battery pack with at least one other cinematography battery pack. A male electrical connection is supported by the second surface of the cinematography battery pack. The male electrical connection is configured to be received in the female electrical connection of the other cinematography battery pack to electrically connect the cinematography battery pack with the other cinematography battery pack. At least one power port is defined in the cinematography battery pack. The power port is configured to charge the cinematography battery pack and the other cinematography battery pack in a parallel arrangement by a single source of electrical power connected with the cinematography battery pack. The power port is also configured to discharge the cinematography battery and the other cinematography battery pack in the parallel arrangement.

Referring particularly to FIGS. 2 to 4, an actuatable post (see, e.g., post 127) is arranged in the cinematography battery pack 101.

The actuatable post is configured to be actuated between a first retracted position and a second extended position. An actuation button is arranged in the cinematography battery pack. The actuation button is operably coupled with the actuatable post. The actuation button is configured to actuate the actuatable post between the first retracted position and a second extended position. Upon actuation of the actuatable post to the extended position, the actuatable post pushes against another cinematography battery pack to separate the cinematography battery pack from the other cinematography battery pack.

Figure 8:
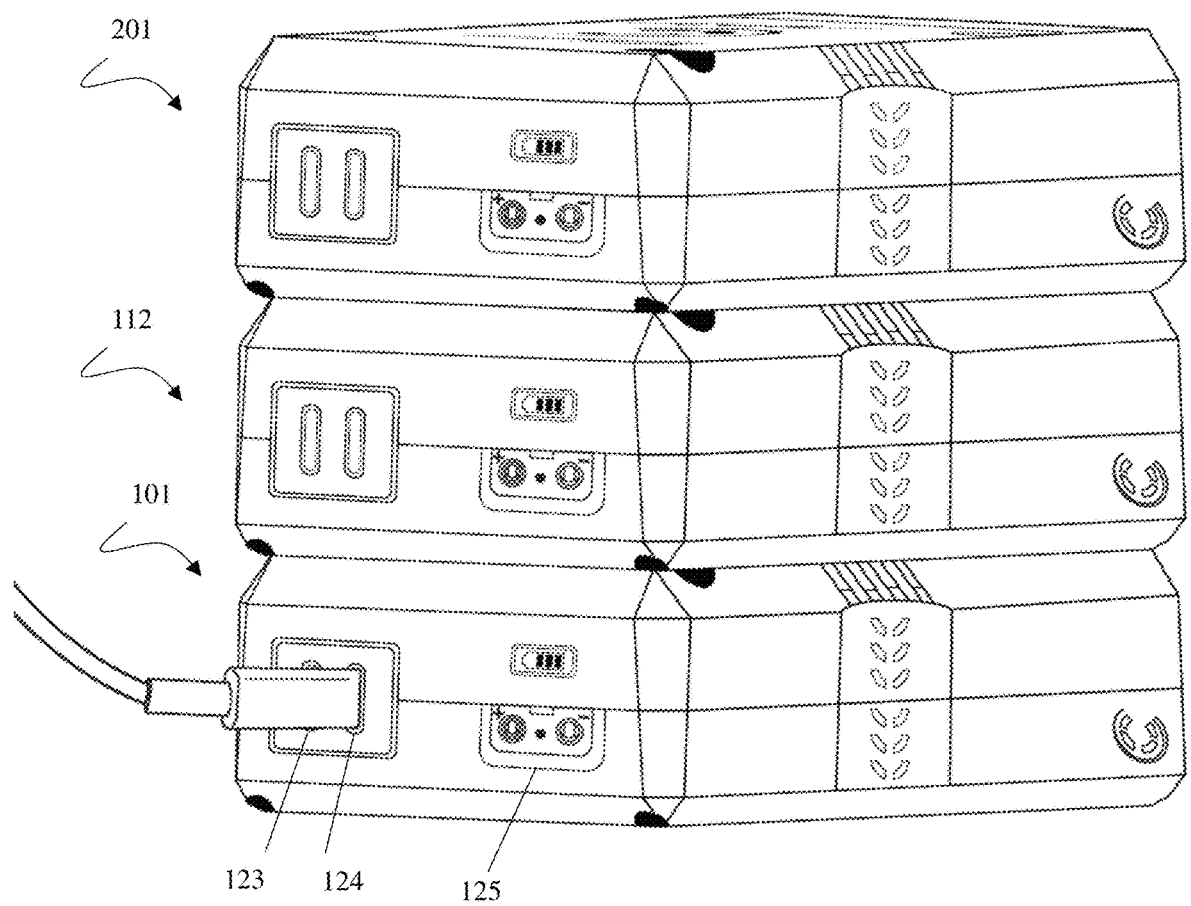
FIG. 8 is a perspective view of a set of three stacked cinematography battery packs connected with a power cable according to aspects of the present disclosure.
Figure 9:
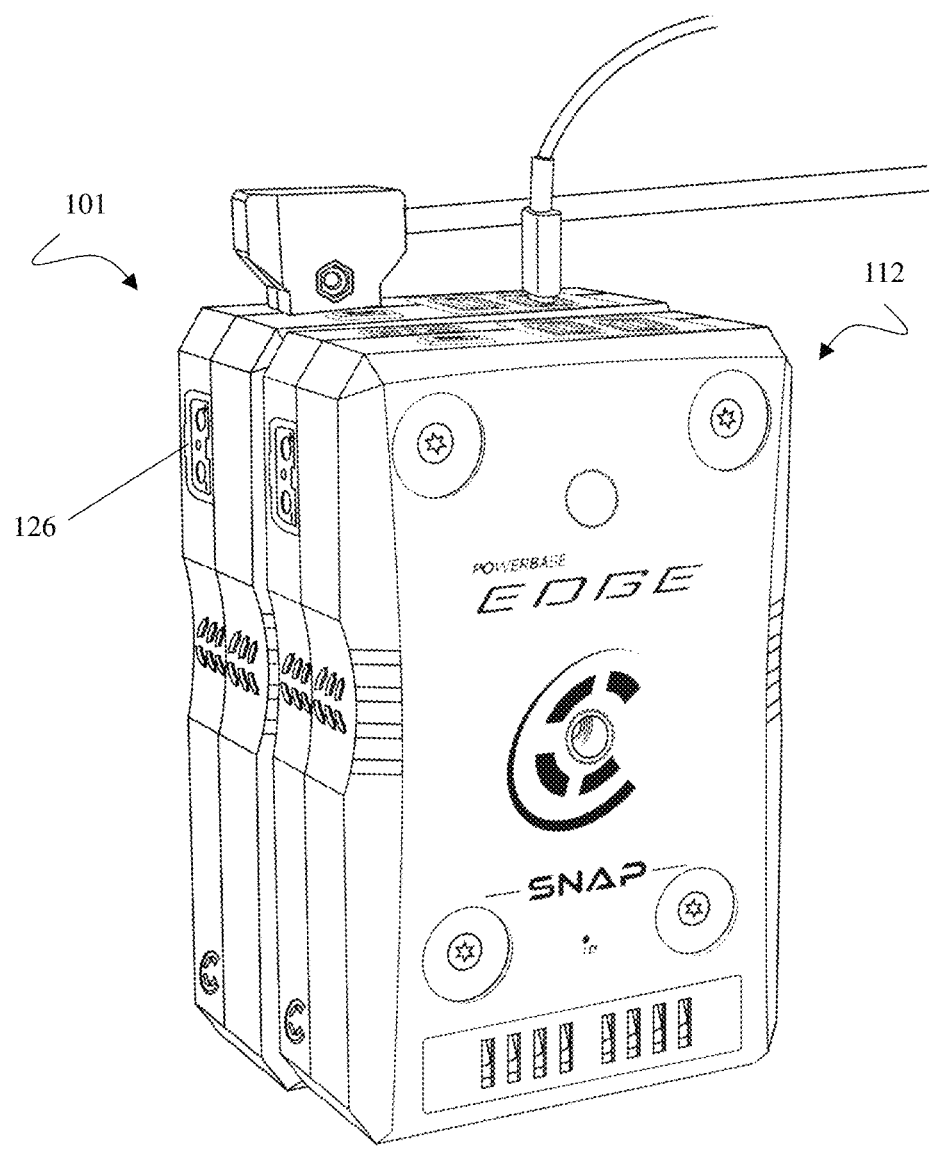
FIG. 9 is a front, perspective view of two stacked cinematography battery packs with one of the stacked cinematography battery packs connected with a USB-C power cable and a DTAP power cable according to aspects of the present disclosure.
Figure 10:
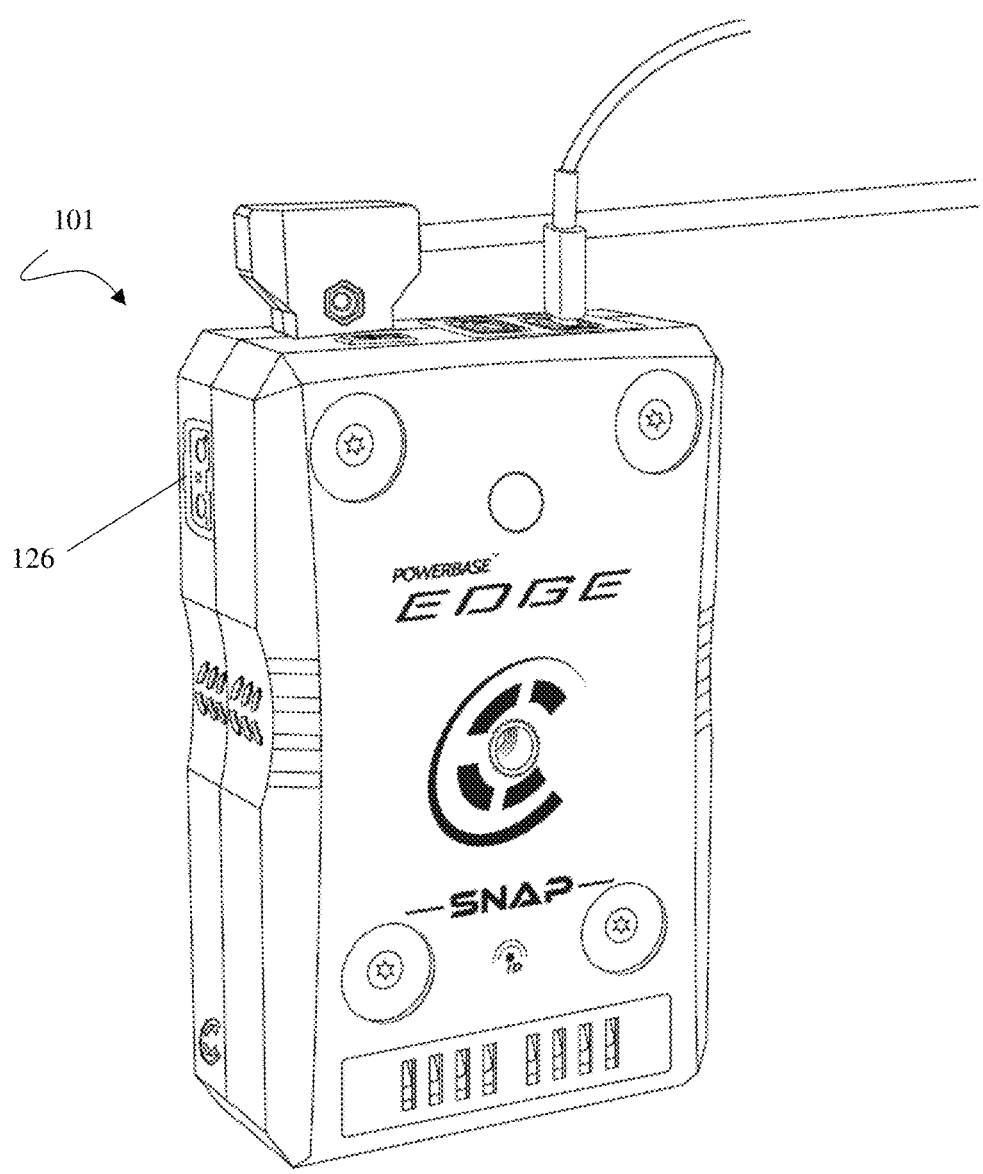
FIG. 10 is a front, perspective view of a single cinematography battery pack connected with a USB-C power cable and a DTAP power cable according to aspects of the present disclosure.

In use, the flow of electrical current between the cinematography battery packs may be controlled by at least one onboard MCU of a cinematography battery pack. For example, the MCU of the one battery pack in the stack connected with a charging cable (e.g., a USB-C charging cable as in FIG. 8) can be selected as the governing MCU to control the flow of electrical charging power to the other battery packs in the stack. Thus, power can be distributed until each partially charged battery pack in the stack has approximately the same level of charge. When the charge levels have been approximately or substantially equalized between the battery packs, the electrical charging power can then be evenly distributed between the battery packs to power or charge the battery packs. As an example, the electrical charging power can pass through a first battery in a stack and into the second battery in the stack, and the electrical charging power can further pass through the second battery in the stack and into the third battery in the stack such that each of the batteries (e.g., three batteries 101, 112, and 201 of system 100 as illustrated in FIG. 8) is charged at substantially the same rate.

During the process of equalizing the initial charge level of the battery packs, the electrical power stored in one battery can be passed to another battery in the stack. For example, a fully charged first battery in a stack might be at least partially used to charge two additional batteries in the stack the are fully depleted. In this example, if no external source of charging power is provided, a fully charged first battery connected with two completely drained second and third batteries would result in a stack with three battery packs that are each approximately ⅓ charged. Thus, when a source of external charging power is provided, each of the battery packs can then be charged at substantially the same rate, as described or incorporated by reference herein.

Referring now to FIGS. 13 to 17, other aspects of fastening plates are shown. The fastening plates (collectively "fastening plates 231") of FIGS. 13-17 share several similarities to the fastening plate 131 described herein. In the interest of brevity and clarity, some of the similarities between the fastening plate 131 and the fastening plates 231 will not be described in detail. Additionally, each of the fastening plates 231a-231c in FIGS. 15-17 have the same or similar first surface 237 as the first surface 237 of the fastening plate 231 shown in FIG. 13, and a different second surface 250 from each other. Additionally, while the description below indicates that the fastening plates 231 are configured to connect with the first cinematography battery pack 101, the fastening plates 231 are also configured to connect with the second cinematography battery pack 112, for instance.

Figure 13:
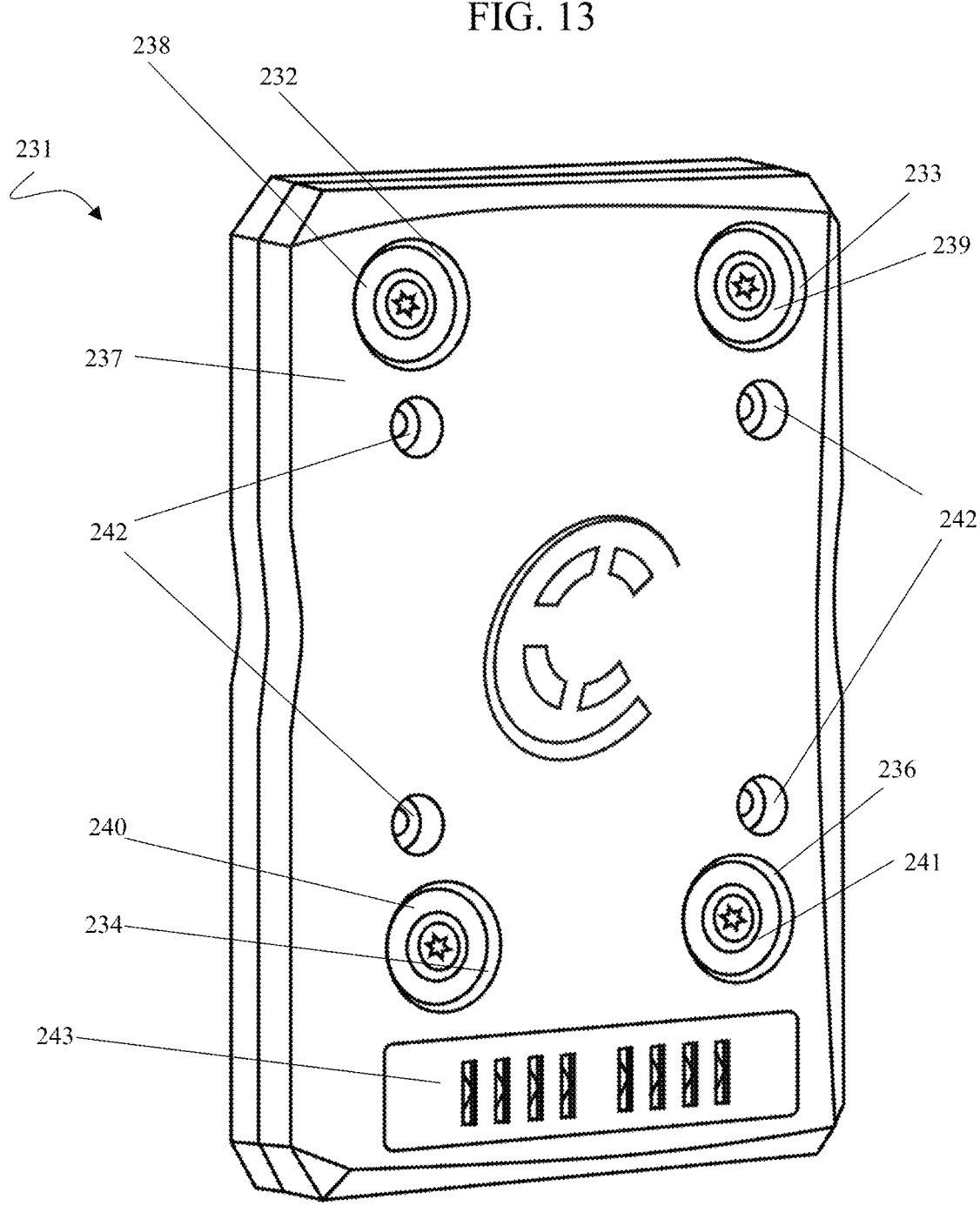
FIG. 13 is a front, perspective view of a fastening plate according to aspects of the present disclosure.

With particular reference to FIGS. 13, the first surface 237 of the fastening plate 231 is shown. The fastening plate 231 is configured to connect with the first cinematography battery pack 101, and is configured to connect with a cinematography device 132 (see, e.g., a camera in FIGS. 11 and 12). More particularly, the fastening plate 231 is configured to mechanically and electrically connect with the first cinematography battery pack 101, and is configured to mechanically and electrically connect with the cinematography device 132. The fastening plate 231 is also configured to transmit data between the first cinematography battery pack 101 and the cinematography device 132, such as through an SMBUS connection.

The fastening plate 231 includes a plurality of orifices (see, e.g., orifices 232, 233, 234, 236 in FIG. 13) defined in the first surface 237 of the fastening plate 231. A first metal or magnetic member (see, e.g., metal or magnetic members 238, 239, 240, 241 in FIG. 13; collectively referred to herein as "magnetic member 238" or "magnetic members 238") is arranged in each of the orifices. Additionally, a plurality of through holes 242 extend through the fastening plate 231 to allow the fastening plate 231 to be mechanically connected with the cinematography device 132 having corresponding holes, for instance, such as by employing a number of screws or bolts.

The first cinematography battery pack 101 includes a plurality of projections (see, e.g., projections 151, 152, 153, 154 in FIG. 11) extending from a second surface 155 of the first cinematography battery pack 101 and corresponding with the orifices 232, 233, 234, 236 of the fastening plate 231. A metal or magnetic member (see, e.g., metal or magnetic member 156 in FIG. 11) is supported by each of the projections. Each metal or magnetic member 156 of the first cinematography battery pack 101 is configured to magnetically connect with or engage the corresponding magnetic member 238 of the fastening plate 231 to magnetically connect the first cinematography battery pack 101 with the fastening plate 231.

The fastening plate 231 includes a first (e.g., female) electrical connection 243 that is supported by the first surface 237 of the fastening plate 231. The first electrical connection 243 of the fastening plate 231 is configured to electrically connect to a corresponding (e.g., male) electrical connection 157 (see FIG. 11) of the first cinematography battery pack 101.

In an aspect of the present disclosure, the first electrical connection 243 of the fastening plate 231 and the corresponding electrical connection 157 of the first cinematography battery pack 101 define an electrical power connection assembly, which is configured to transmit electrical power and data. For example, the first electrical connection 243 of the fastening plate 231 and the corresponding electrical connection 157 of the first cinematography battery pack 101 define a leaf spring electrical connection assembly.

Accordingly, mechanical engagement between the fastening plate 231 and the first cinematography battery pack 101 also results in an electrical engagement between the fastening plate 231 and the first cinematography battery pack 101.

Figure 14:
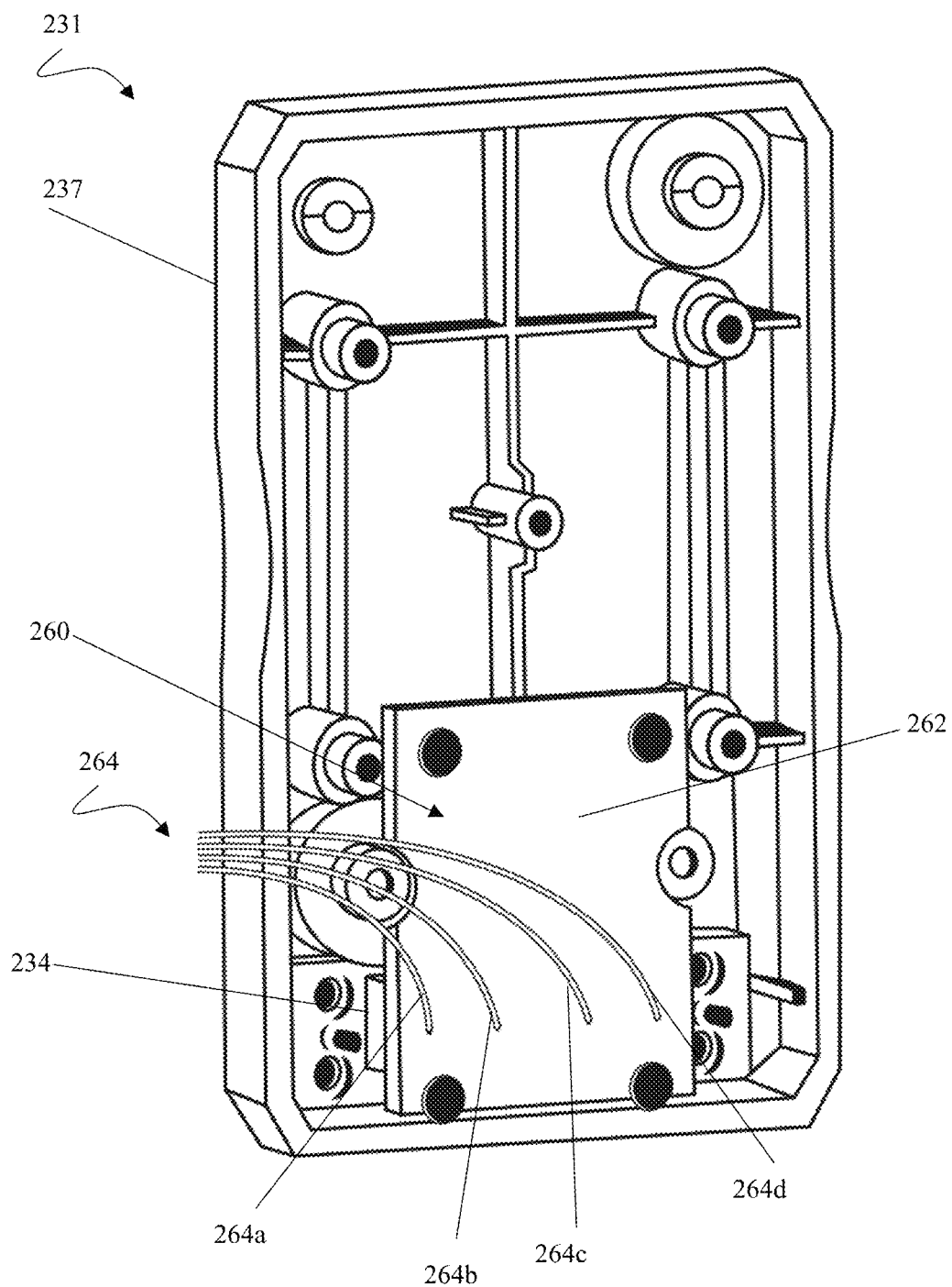
FIG. 14 is a rear, perspective view of the fastening plate of FIG. 13 shown with portions omitted.

Referring now to FIG. 14, internal components of the fastening plate 231 are shown. In particular, a second electrical connection 260 of the fastening plate 231 is shown and is electrically coupled to the first electrical connection 243 of the fastening plate 231. The second electrical connection 260 includes a printed circuit board 262 and a plurality of wires 264 engaged therewith, which can function as an electrical interconnect. In the illustrated aspect, the plurality of wires 264 includes a first wire 264a (e.g., a negative wire), a second wire 264b (e.g., a SDA smart battery connection), a third wire 264c (e.g., a SCL smart battery connection), and a fourth wire 264d (e.g., a positive wire). The free ends of the wires 264 can be terminated with an appropriate connector or directly soldered to the cinematography device 132, for example.

The second electrical connection 260 is configured to electrically engage an electrical connection of the cinematography device 132. Thus, the fastening plate 231 is configured to receive electrical power and data from the first cinematography battery pack 101, and is configured to transmit electrical power and data to the cinematography device 132.

Figure 15:
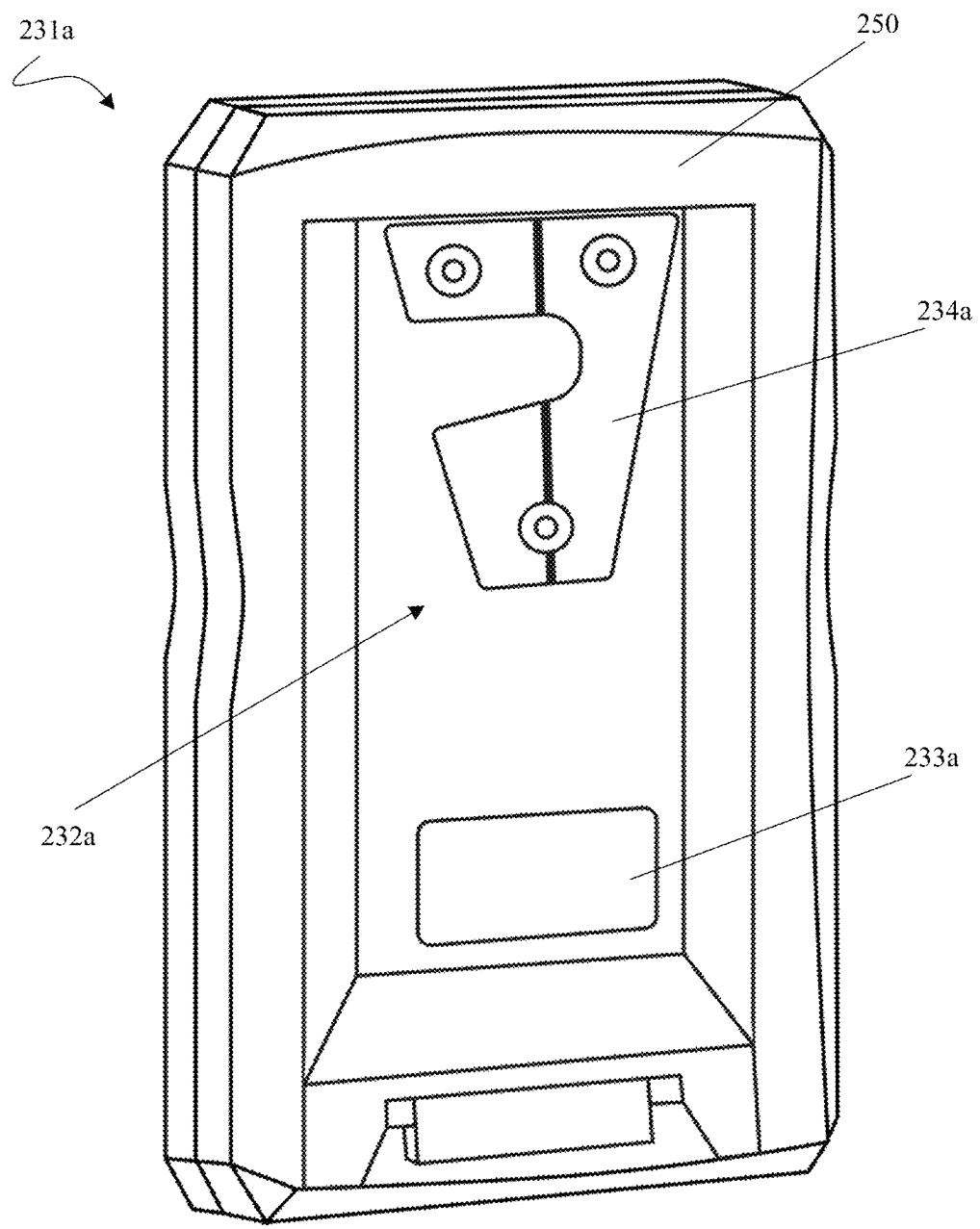
FIG. 15 is a rear, perspective view of the fastening plate of FIG. 13 having a V-mount mechanical adapter, according to aspects of the present disclosure.
Figure 16:
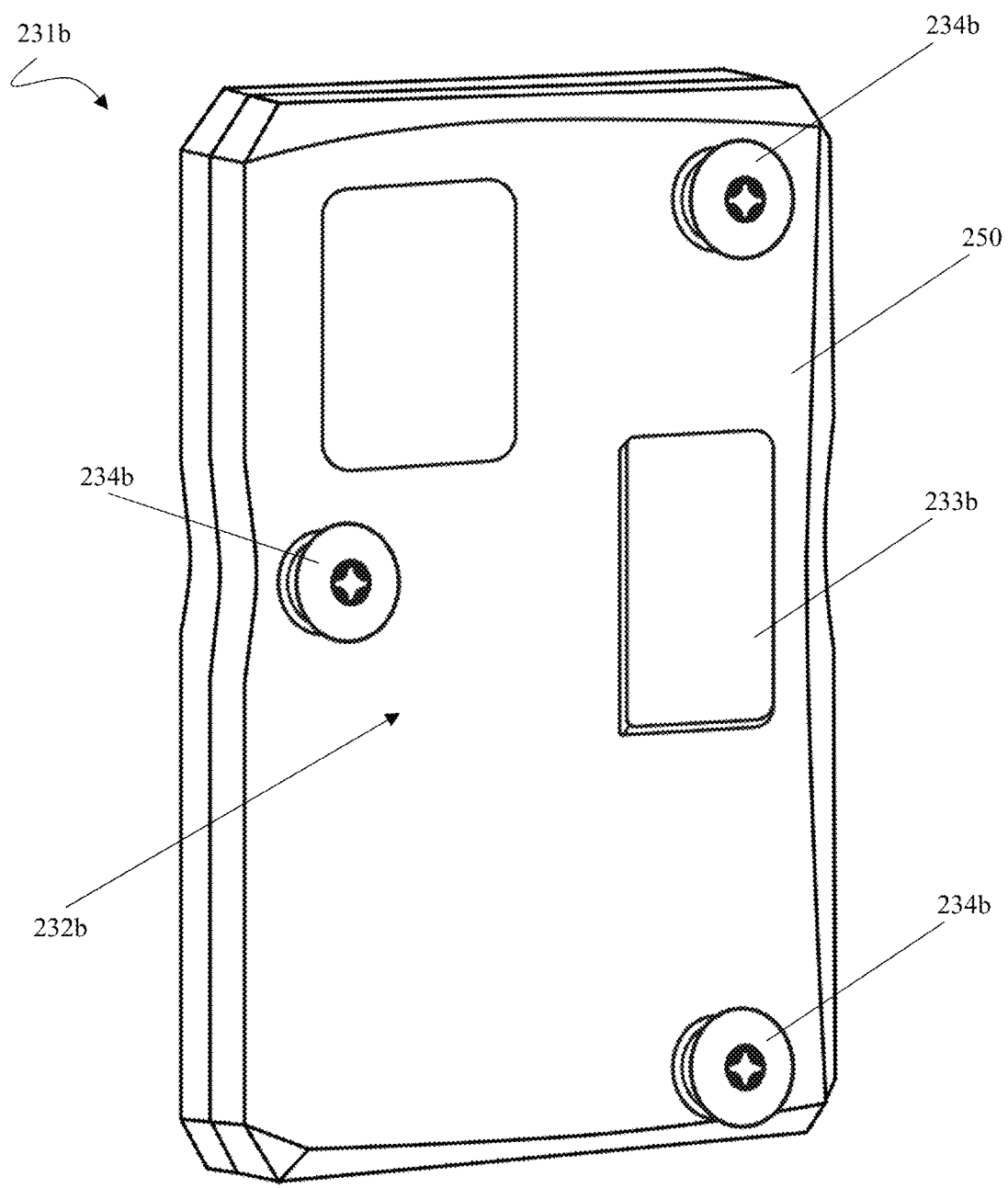
FIG. 16 is a rear, perspective view of the fastening plate of FIG. 13 having a G-mount mechanical adapter, according to aspects of the present disclosure.
Figure 17:
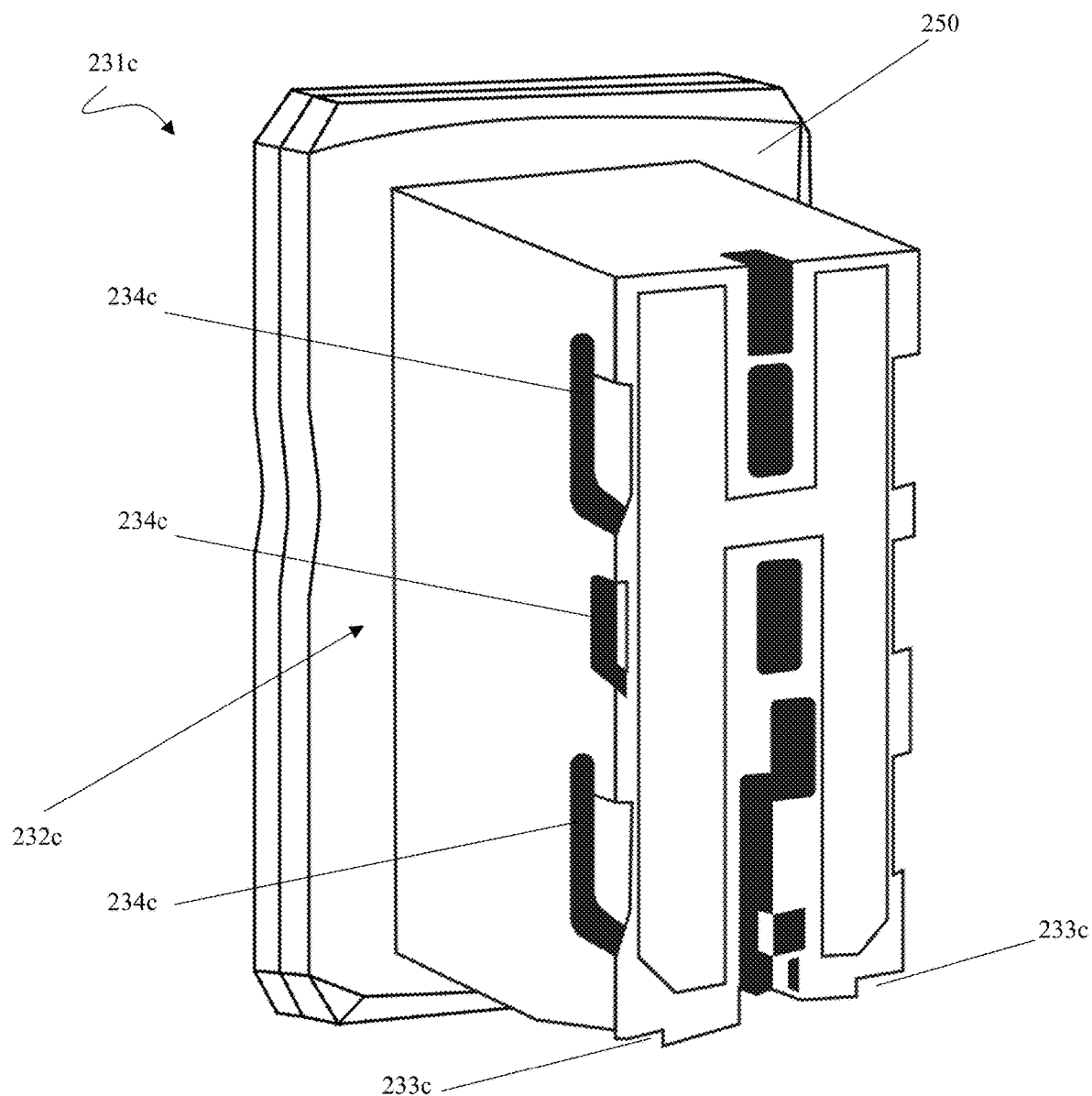
FIG. 17 is a rear, perspective view of the fastening plate of FIG. 13 having a B-mount mechanical adapter, according to aspects of the present disclosure.

Referring now to FIGS. 15 to 17, different aspects of the second surface 250 of the fastening plate 231 are shown. Each illustrated aspect includes a different mount arrangement configured to mechanically engage the cinematography device 132. That is, the embodiments described below with reference to FIGS. 15 to 17 enable the fastening plate 231 to operate as an adapter between the cinematography device 132 and the magnetic/electrical connections described herein.

With initial regard to FIG. 15, a fastening plate 231a having a V-mount adapter 232a is shown. The V-mount adapter 232a includes a V-mount electrical terminal block 233a, and a V-shaped bracket 234a. The fastening plate 231a is configured to mechanically and electrically engage a cinematography device 132 that includes features for engaging a V-mount battery, for instance.

Referring now to FIG. 16, a fastening plate 231b having a G-mount adapter 232b is shown. The G-mount adapter 232b includes a G-mount electrical terminal block 233b, and a plurality of locating pins 234b. The fastening plate 231b is configured to mechanically and electrically engage a cinematography device 132 that includes features for engaging a G-mount battery, for instance.

Referring now to FIG. 17, a fastening plate 231c having a B-mount adapter 232c (e.g., a camcorder adapter) is shown. The B-mount adapter 232c includes B-mount electrical terminals 233c, and a plurality of mechanical engagement features 234c. The fastening plate 231c is configured to mechanically and electrically engage a cinematography device 132 that includes features for engaging a B-mount battery or a camcorder, for instance.

A shape, size, and dimensions of each of the orifices, protrusions and magnets are arranged to correspond with each other. That is, the orifices are shaped to receive the protrusions therein (e.g., to prevent lateral movement of the cinematography battery packs with respect to each other). As an example, each of the protrusions and orifices may define a circular, cylindrical, or tubular shape.

A shape defined by the magnetic or metal members may be circular, cylindrical, or donut shaped. A size defined by each of the metal or magnetic members may be arranged so that the metal or magnetic member fit into the orifices or at a distal-facing end of the projections. The projections may also be referred to as posts or protrusions, and the orifices may also be referred to as indents or recesses. In use, the metal or magnetic members may be arranged to directly contact each other. The metal or magnetic members may each be secured to the corresponding projection or orifices by a connecting member, such as a screw, grommet, or the like.

A USB-C PD connection device, system, and method are described in U.S. patent application Ser. No. 18/428,874, the entire contents of which are incorporated by reference herein.

An exemplary switching circuit for cinematography battery packs (e.g., battery pack 101) is described in U.S. Pat. No. 10,630,095, the entire contents of which are incorporated by reference herein. The switching circuit may be employed to switch the output voltage provided by cinematography battery pack 101.

Dual voltage battery packs are described in U.S. Pat. No. 11,735,841, the entire contents of which are incorporated by reference herein, and U.S. Pat. No. 11,770,012, the entire contents of which are incorporated by reference herein.

The battery packs described herein may be configured to connect with one or more battery mount plates. The battery mount plates described herein may be in the form of various battery mount arrangements, such as V-mount, G-mount, B-mount, or other arrangements configured to connect with a corresponding cinematography battery pack (e.g., cinematography battery pack 101) via an electromechanical connection. Mount plates having different mounting arrangements for connecting with different types of batteries is described in U.S. Pat. No. 10,197,630, the entire contents of which are incorporated by reference herein. A mount plate having various features is described in U.S. Pat. No. 10,841,492, the entire contents of which are incorporated by reference herein.

As an example, the magnets of the metal or magnetic members described herein may be neodymium magnets and the metal of the metal or magnetic member may be or may include steel, iron, nickel, or cobalt.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A system for engaging cinematography battery packs with a cinematography device, comprising:
   a first cinematography battery pack, the first cinematography battery pack including:
      a first magnetic member coupled to a first surface of the first cinematography battery pack;
      a second magnetic member coupled to a second surface of the first cinematography battery pack;
      a first electrical connection supported by the first surface of the first cinematography battery pack; and
      a second electrical connection supported by the second surface of the first cinematography battery pack;
   a second cinematography battery pack configured to be electrically and mechanically connected with the first cinematography battery pack, the second cinematography battery pack including:
      a third magnetic member coupled to a first surface of the second cinematography battery pack, the third magnetic member configured to magnetically engage the second magnetic member to magnetically connect the first cinematography battery pack with the second cinematography battery pack;
      a third electrical connection supported by the first surface of the second cinematography battery pack, the third electrical connection configured to engage the second electrical connection to electrically connect the first cinematography battery pack with the second cinematography battery pack; and
   a fastening plate configured to be mechanically and electrically connected with the first cinematography battery pack, and configured to be mechanically and electrically connected with a cinematography device, the fastening plate including:
      a fourth magnetic member coupled to a first surface of the fastening plate, the fourth magnetic member configured to magnetically engage the first magnetic member to magnetically connect the fastening plate with the first cinematography battery pack; and
      a fourth electrical connection supported by the first surface of the fastening plate, the fourth electrical connection configured to engage the first electrical connection to electrically connect the fastening plate with the first cinematography battery pack.

2. The system of claim 1, wherein the fastening plate is configured to be electrically connected with the cinematography device by a wired connection.

3. The system of claim 2, wherein the fastening plate includes a fifth electrical connection supported by the second surface of the fastening plate, the fifth electrical connection configured to engage an electrical connection of the cinematography device to electrically connect the fastening plate with the cinematography device.

4. The system of claim 1, wherein the fastening plate includes a V-mount battery mount arrangement.

5. The system of claim 1, wherein the fastening plate includes a G-mount battery mount arrangement.

6. The system of claim 1, wherein the fastening plate includes a B-mount battery mount arrangement.

7. The system of claim 1, further including at least one power port defined in the first cinematography battery pack or the second cinematography battery pack, wherein the at least one power port is configured to charge the first cinematography battery pack and the second cinematography battery pack in a parallel arrangement by a single source of electrical power connected with one of the first cinematography battery pack or the second cinematography battery pack.

8. The system of claim 7, wherein the at least one power port is configured to discharge the first cinematography battery pack and the second cinematography battery pack in the parallel arrangement.

9. The system of claim 7, wherein the at least one power port is configured to power an accessory product.

10. The system of claim 7, wherein the at least one power port includes at least one of a USB-C PD power port or a DTAP port.

11. The system of claim 1, wherein the second electrical connection of the first cinematography battery pack and the third electrical connection of the second cinematography battery pack define an electrical power connection assembly, and wherein the electrical connection assembly is configured to transmit electrical power and data.

12. The system of claim 1, wherein the first electrical connection of the first cinematography battery pack and the fourth electrical connection of the fastening plate define an electrical power connection assembly, and wherein the electrical connection assembly is configured to transmit electrical power and data.

13. The system of claim 1, wherein the second electrical connection of the first cinematography battery pack and the third electrical connection of the second cinematography battery pack define a leaf spring electrical connection assembly.

14. The system of claim 1, wherein the first electrical connection of the first cinematography battery pack and the fourth electrical connection of the fastening plate define a leaf spring electrical connection assembly.

15. The system of claim 1, wherein the fastening plate includes at least one of a printed circuit board or an electrical interconnect associated with the fourth electrical connection.

16. A fastening plate configured to be mechanically and electrically connected with a cinematography battery pack and a cinematography device, the fastening plate comprising:
- a first magnetic member coupled to a first surface of the fastening plate and configured to magnetically engage a first magnetic member of the cinematography battery pack;
- a second magnetic member coupled to the first surface of the fastening plate and configured to magnetically engage a second magnetic member of the cinematography battery pack, wherein the first and second magnetic members are asymmetrically aligned with each other to form a directional orientation between the fastening plate and the cinematography battery pack;
- a first electrical connection supported by the first surface of the fastening plate and configured to electrically engage an electrical connection on the cinematography battery pack; and
- a second electrical connection supported by a second surface of the fastening plate and configured to electrically engage an electrical connection on the cinematography device.

17. The fastening plate of claim 16, wherein the second surface of the fastening plate is configured to mechanically engage the cinematography device utilizing one of a V-mount battery mount arrangement, a G-mount battery mount arrangement, or a B-mount battery mount arrangement.

18. The fastening plate of claim 16, wherein the second electrical connection includes at least one of a printed circuit board or an electrical interconnect.

19. The fastening plate of claim 16, wherein the first electrical connection of the fastening plate and the electrical connection of the cinematography battery pack define a first electrical power connection assembly, and wherein the first electrical connection assembly is configured to transmit electrical power and data.

20. The fastening plate of claim 19, wherein the second electrical connection of the fastening plate and the electrical connection of the cinematography device define a second electrical power connection assembly, and wherein the second electrical connection assembly is configured to transmit electrical power and data.

* * * * *